United States Patent [19]

Rudmann

[11] 3,992,671

[45] Nov. 16, 1976

[54] CIRCUIT ARRANGEMENT FOR AUTOMATIC MONITORING OF PROTECTION TIME PERIODS IN STREET TRAFFIC SIGNAL SYSTEMS

[75] Inventor: Edgar Rudmann, March-Buchheim, Germany

[73] Assignee: Siemens Aktiengesellschaft, Berlin & Munich, Germany

[22] Filed: Mar. 6, 1975

[21] Appl. No.: 555,839

[30] Foreign Application Priority Data

Mar. 18, 1974 Germany .......................... 2412963

[52] U.S. Cl. .................................. 328/63; 328/42; 328/72; 340/40

[51] Int. Cl.[2] ...................... H04B 1/00; G08G 1/00

[58] Field of Search ............. 307/220, 224; 328/42, 328/45, 72, 63; 340/40, 41

[56] References Cited

UNITED STATES PATENTS

| | | | |
|---|---|---|---|
| 3,072,883 | 1/1963 | Hendricks et al. | 340/40 |
| 3,641,486 | 2/1972 | Brocket et al. | 340/41 |
| 3,816,796 | 6/1974 | Molby et al. | 340/40 |

*Primary Examiner*—Stanley D. Miller, Jr.
*Assistant Examiner*—B. P. Davis
*Attorney, Agent, or Firm*—Hill, Gross, Simpson, Van Santen, Steadman, Chiara & Simpson

[57] ABSTRACT

A circuit arrangement for the automatic monitoring of protection time periods in street traffic signal systems, wherein, on the commencement of the "stop" signal for a group of signals a switching device, determining the protection periods for one or more incompatible signal groups, is initiated, employing a pulse train counter for each group of signals, which may be in the form of a binary counter with a plurality of flip-flops, at the outputs of which counter arbitrary time signals may be obtained representing specific protection time periods which are conducted to respective individual trigger elements operatively connected to the pertinent incompatible signal groups, with such trigger elements being set when the corresponding counter step is reached for the desired protective period, and which, for the remainder of the existing stop signal, emit a "free" signal to the pertinent incompatible signal group, the "go" signal for a signal group which is to be released being linked by an AND gate with all "free" signals of incompatible signal groups. The "go" signal of a signal group also may be linked by an AND gate with the inverted "free" signals, of all the incompatible signal groups, to form a fault signal.

4 Claims, 3 Drawing Figures

CIRCUIT ARRANGEMENT FOR AUTOMATIC MONITORING OF PROTECTION TIME PERIODS IN STREET TRAFFIC SIGNAL SYSTEMS

BACKGROUND OF THE INVENTION

The invention is directed to a circuit arrangement for the automatic monitoring of protection time periods in street traffic signal systems, in which, upon the commencement of the "stop" signal for a group of signals, a switching device determining the protection time for one or more incompatible groups of signals is initiated.

A circuit of this general type is disclosed in German Pat. No. 1,132,835, in which the signal contacts are arranged in series with contacts of local timed switching mechanisms each of which respond after the disconnection of the signal lamps releasing the traffic in one traffic direction and, for the duration of their switching delay which is governed by the clearance time of the intersection, suppress or delay the connection of the signal lamps releasing traffic in the other traffic direction. In such known device, the time switching mechanisms are in the form of electric motors which are actuated at the beginning of the protection time and are automatically stopped by a cam switch at the end of the protection time. Timed mechanisms of this type are relatively expensive and require a relatively large amount of space. Further, such a switching mechanism, employing a cam switch, can in each case represent only a single specific protection time. So that in general, a group of signals would have to have a special motor for each incompatible traffic direction in order to be able to provide the respective different time clearance priods.

Modern traffic signal devices frequently are controlled from a central location or device in order to permit arbitrary variations in the signal operational sequence, on the basis of superordinate considerations, without the necessity of any switch-overs or changes at the relevant street intersection. Thus, in such cases each signal group obtains its "stop" and "go" (red and green) command signals from the central switching device, whereby the switching sequence cannot be controlled at the intersection itself. This, however, creates the dangerous possibility that in the event of an incorrect signal transmission on the lines, which often may be quite long, dangerous situations can arise, i.e. when incompatible traffic flows simultaneously receive a "go" signal or when a "go" signal arrives too early and the necessary protection time periods are not assured.

BRIEF SUMMARY OF THE INVENTION

The invention therefore is directed to a simple arrangement for monitoring the protection time periods at the intersection, and to so link the centrally switched signal groups that a "go" command, arriving too early, is suppressed or delayed, and in which a fault signal can be readily obtained in a simple manner. Such monitoring circuit can be achieved by the employment of space-saving modern components and is capable of being utilized for any signal group without constructional alterations, as well as capable of providing any normal protection time duration. It is also particularly important that such monitoring circuit be capable of subsequent installation into existing systems without additional expensive alterations, etc.

The objective is achieved in the present invention by the provision of a protective time switching device utilizing a pulse train counter for each signal group, at the outputs of which arbitrary time signals may be obtained for the representation of specific protection time periods, and may be supplied to individual trigger elements assigned to the pertinent incompatible signal groups. Such elements are set whenever the corresponding counter step is reached and, for the remainder of the existing "stop" signal, emit a "free" signal to an incompatible signal group, with the "go" signal for a group of signals which is to be released being linked by an AND gate with all "free" signals of incompatible signal groups.

As a result of such linking, of the particular "go" signal with the "free" signals of incompatible signal groups, it is assured that the particular signal groups does not receive the "go" signal until the protection time periods of all the incompatible traffic flows have been completed. If, however, the control command for such "go" signal arrives too early it is suppressed or delayed until such expiration of the protection time periods.

In a further development of the invention, provision is also made for linking the "go" signal with the inverted "free" signals, of all the incompatible signal groups, by an AND gate to form a fault signal. In this case, if the control command for the "go" signal arrives too early, a fault signal is present until all the "free" signals of the incompatible signal groups are present. In dependence upon the specific application, such fault signal can be employed for effecting optical or audio displays or for operative disconnection of the system.

In an advantageous embodiment of the invention, the pulse train counter may be in the form of a binary counter with a plurality of a flip-flops, whose outputs may be linked with one another in arbitrary manner to form various binary-coded time units or periods.

BRIEF DESCRIPTION OF THE DRAWINGS

In the drawings wherein like reference characters indicate like or corresponding parts.

DETAILED DESCRIPTION OF THE INVENTION

Figure 1:
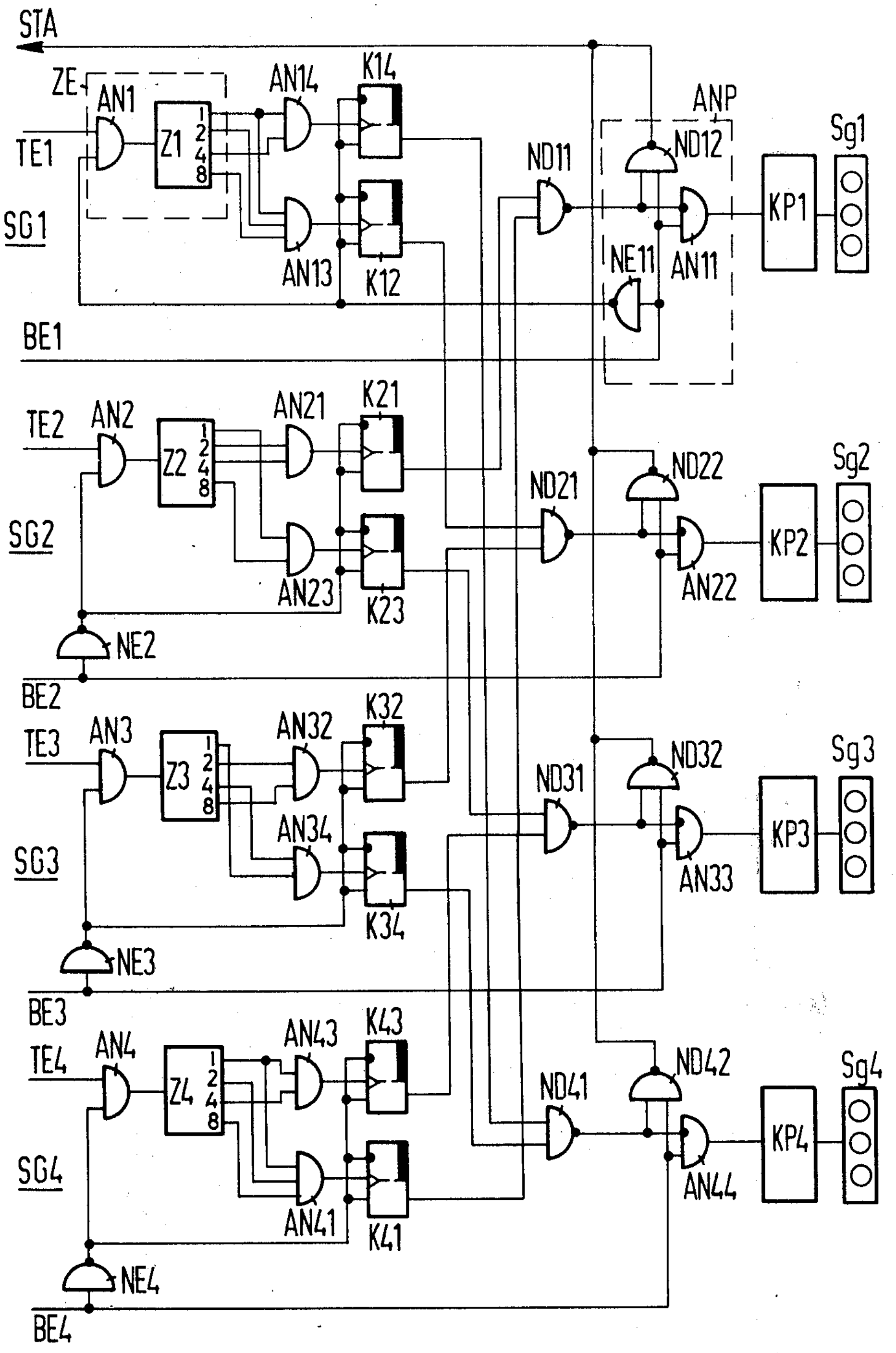
FIG. 1 is a circuit diagram, in block form, of a protection time monitoring circuit, in accordance with the invention, for a simple signal installation having four individually controlled groups of signals.

Referring to the drawings and more particularly to FIG. 1, four centrally controlled signal groups are illustrated, which are provided with means, in accordance with the invention, for monitoring the protection time periods, and in which the switching commands emanate from a superordinate control device (central control) over a line BE1, to a junction point device KP1 and from there to the signals Sg1, and in like manner over line BE2 to the junction point device KP2 and to signals Sg2, etc. In each case, a protection time monitoring device in accordance with the invention is connected to the associated junction point at its input side.

Such monitoring circuit will be described in detail with reference to the signal group SG1, with the construction of the monitoring circuits for the other signal groups SG2, SG3 and SG4 all being of identical construction.

The monitoring circuit is operatively connected whenever the associated signal group receives a "stop" signal. Consequently, assuming that the signal group SG1 had initially received the "go" signal and the signals Sg1 have been actuated to "green," the signal state "1" is present at the command input BE1 and in order to switch the signals Sg1 to "red," the signal state "0" must be supplied from the central control over the command input Be1. Such "0" state is inverted by the negation element NE11, from which it is supplied to an input of AND gate AN1, with another input TE1 being supplied with a "second" pulse-train. Upon the receipt of the "stop" signal for the signal group SG1, the "second" pulse-train is conducted over AND gate AN1 to the counter Z1 which is provided with binary-coded outputs 1, 2, 4, 8, which outputs can be arbitrarily linked in suitable fashion to provide any desired protection time period of between one and fifteen seconds. For example, assuming the outputs 1 and 4 are linked over the AND gate AN14, a signal will pass to the pulse train input of the trigger element K14 at the fifth second.

The inputs of the trigger elements K14 and K12 are likewise connected to the negation element NE11, whereby such inputs possess a "0" state whenever the signal "1" is present at the command input BE1. When the command signal changes from "1" to "0" the trigger elements K14 and K12 are released. At the programmed second the counter pulse train will be conducted over AND gate AN14 or AN13 to the associated trigger element K12 or K14, whereby such trigger element will be set to then display a logic "1" at its output. This represents a "free" signal for a connected incompatible signal group, which thus, in each case, appears after the expiration of the programmed protection time period with respect to such incompatible signal group, and remains in existence until the associated trigger element is reset. This will take place when a "go" (green) signal is received at the command input BE1 in the form of a logic "1".

In corresponding manner, the trigger elements K21 and K23 of signal group SG2, trigger elements K32 and K34 of signal group SG3 and trigger elements K43 and K41 of signal group SG4 are set. Each signal group contains as many trigger elements as protection time periods which must be provided for incompatible signal groups, and each trigger element thus is set at the desired, individually programmed protection time period. The desired programming is carried out over AND gates AN14, AN12, AN21, etc., which are, in each case, connected to the outputs of the respective counters Z1, Z2, etc.

The trigger elements K14, K12, etc. thus form, at the programmed times, "free" signals for the incompatible signal groups, with the particular required "free" signals being linked over an AND link to the associated "go" (green) signals. In the present example, the NAND gates ND11, ND21, ND31, ND41 serve such purpose. Consequently, only when the "free" signals of the signal groups SG2 and SG4 are present at the NAND gate ND11, does a "0" appear at the latter's output and which is again supplied, in negated form, to the AND gate AN11. The command signal from the command input BE1 is present at the other input of the AND gate AN11. Thus, only when the "free" signals of all incompatible signals are present can the "go" command (logic "1") reach the output of the AND gate AN11, and from there be supplied to the junction point device KP1, in order to produce a "green" signal in the signals Sg1. The command inputs BE2 to BE4 are similarly linked to signal groups incompatible therewith.

In addition, the output of the NAND gates ND11, ND21, ND31 and ND41 are in each case connected to an input of a respective further NAND gate ND12, ND22, ND32, ND42, the second input of which is directly connected to the associated command input BE1 to BE4. Thus, a "0" will be present at the output of such second NAND gates ND12 to ND42 whenever a "go" command, in the form of a "1" is received at the associated command input BE, and all "free" signals have not yet appeared from the incompatible signal groups. A fault signal thus is formed which may be supplied over the fault output STA to the central control. Such signal can then be utilized for optical or audio display, or in specific situations, for the disconnection of the system.

Figure 2:
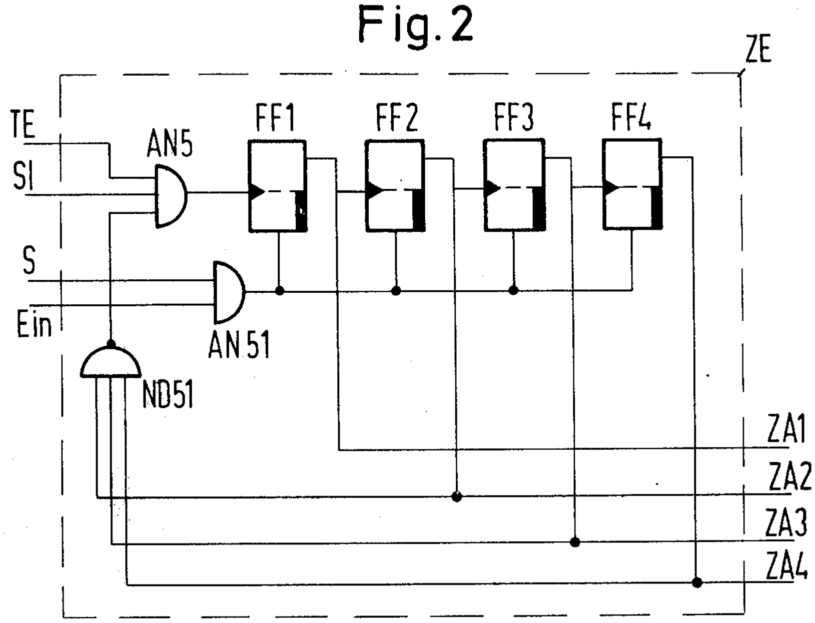
FIG. 2 is a schematic diagram of the pulse train counter device, illustrated generally in block form in FIG. 1.

FIG. 2 illustrates the circuit, in detail, of the counter device ZE illustrated in FIG. 1. A continuous "second" pulse-train is supplied at the pulse train input TE while the inverted command signal is supplied to the input SI. The direct command signal is supplied at the input S, while the opposite signal thus is supplied to the input SI. Finally, the connect criterion of the system is supplied to the input EIN i.e. when the system is connected the signal "1" is always present.

If the signal "1" is supplied at the input SI the pulse train at the input TE is supplied, over AND gate AN5, as a logic "1" is also present at the third input thereof as long as the flip-flops FF1 to FF4 are not set. The binary counter, comprising the flip-flops FF1 to FF4, is now actuated by the "second" pulse-train and at counter step 14 the condition for the gate ND51 is fulfilled whereby the counter is blocked over AND gate AN5. As soon as the command signal of the associated signal group again becomes "1," i.e. at the beginning of a "green" phase, the flip-flops of the counter are reset over the AND gate AN51. When the system is disconnected the signal at the input EIN is "0" and the counter thus cannot be reset. The respective binary-coded time steps can be derived at the outputs ZA1 to ZA4 during the counter cycle.

Figure 3:
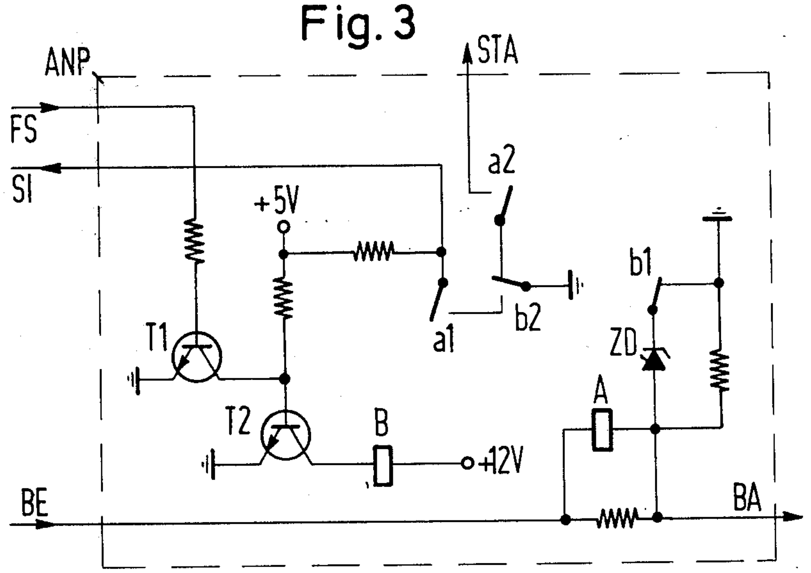
FIG. 3 is an adapter circuit, constructed with conventional components, adapted to be employed as a linking element between the monitoring device and an existing signal group.

FIG. 3 illustrates an adapter circuit ANP by means of which the protection time period monitoring facilities of the invention can be applied to an existing system. In this construction, a conversion has been made from the logic switching elements of FIG. 1 to conventional components. Present at the input BE is the command criterion from the central control for the associated signal group, which in a normal situation is supplied over the output BA to the associated junction point device KP. The "free" signal passes from the monitoring circuit into the adapter circuit at the input FS and, as soon as the "free" signals from all the incompatible signal groups are present, a logic "0" will be supplied at this input from the NAND gate ND11 (FIG. 1). Upon the appearance of this "0" signal, the relay B will be energized, over transistors T1 and T2, to open contact *b*1 removing zero potential from the Zener diode ZD, and thus a "go" command in the form of a "1," present at the input BE, will be applied to the output BA. Simultaneously, the contact *b*2 will apply zero potential to contact *a*1. When the relay A is energized, such zero signal will be conducted over the contact *a*1, as an inverted command signal, into the monitoring circuit and thus to the input SI of the counter device ZE (FIG. 2). However, if the "go" command arrives over the input BE before the relay B is energized, the zero potential is applied over contact *b*2 and contact *a*2 to the output STA so that it may form a fault signal. The voltage at output BA and at the input of the following junction point device KP is maintained at a desired value over the Zener diode ZB.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A circuit arrangement for the automatic monitoring of protection time periods in street traffic signal systems controlled from a central station, in which the respective signal groups thereof are each controlled over a respective individual control line, with the desired signal condition of each of said groups being determined by the potential state existing on the associated control line, and wherein, on the commencement of the "stop" signal for a group of signals, a switching device determining the portection periods for one or more incompatible signal groups is initiated, comprising a pulse train counter for each group of signals, at the outputs of which counter arbitrary time signals may be obtained representing specific protection time periods, respective individual trigger elements operatively connected to the pertinent incompatible signal groups, to which such time signals are conducted, whereby such trigger elements are set when the corresponding counter step is reached for the desired protective period, and which, for the remainder of the existing "stop" signal, emit a free signal to the pertinent incompatible signal group, and an AND gate operatively linking the "go" signal, for a signal group which is to be released, with all "free" signals of incompatible signal groups.

2. A circuit arrangement according to claim 1, wherein the pulse train counter comprises a binary counter with a plurality of series-connected flip-flops.

3. A circuit arrangement according to claim 1, wherein the "go" signal of a signal group is linked by an AND gate with the inverted "free" signals of all the incompatible signal groups to form a fault signal.

4. A circuit arrangement according to claim 3, wherein the pulse train counter comprises a binary counter with a plurality of series-connected flip-flops.

* * * * *